United States Patent
Palaniappan

(10) Patent No.: US 7,730,164 B1
(45) Date of Patent: Jun. 1, 2010

(54) BOOTSTRAP APPROACHES TO DOWNLOADING DATA IN RESPONSE TO A DOWNLOAD INDICATION

(75) Inventor: Murugappan Palaniappan, Issaquah, WA (US)

(73) Assignee: Adobe Systems Incorporated, San Jose, CA (US)

( * ) Notice: Subject to any disclaimer, the term of this patent is extended or adjusted under 35 U.S.C. 154(b) by 883 days.

(21) Appl. No.: 11/285,948

(22) Filed: Nov. 23, 2005

(51) Int. Cl.
*G06F 15/16* (2006.01)

(52) U.S. Cl. .............................. 709/219; 463/42; 707/2; 707/3; 709/217; 709/218; 709/227; 710/33

(58) Field of Classification Search .................. 709/219
See application file for complete search history.

(56) References Cited

U.S. PATENT DOCUMENTS

| | | | |
|---|---|---|---|
| 5,754,784 A * | 5/1998 | Garland et al. .............. | 709/219 |
| 5,919,247 A | 7/1999 | Van Hoff et al. | |
| 6,016,520 A * | 1/2000 | Facq et al. .................... | 710/33 |
| 6,113,652 A | 9/2000 | Lysik et al. | |
| 6,463,468 B1 * | 10/2002 | Buch et al. .................. | 709/219 |
| 6,738,804 B1 * | 5/2004 | Lo .............................. | 709/219 |
| 6,883,168 B1 | 4/2005 | James et al. | |
| 7,028,077 B2 | 4/2006 | Toshimitsu et al. | |
| 2002/0178232 A1 | 11/2002 | Ferguson | |
| 2003/0023745 A1 | 1/2003 | Noe | |
| 2004/0018714 A1 | 1/2004 | Cooney, III et al. | |
| 2004/0205165 A1 * | 10/2004 | Melamed et al. ............ | 709/219 |
| 2005/0044182 A1 | 2/2005 | Kotzin | |
| 2005/0044524 A1 | 2/2005 | Murray et al. | |
| 2005/0086364 A1 | 4/2005 | Muti et al. | |
| 2005/0114430 A1 | 5/2005 | Zheng et al. | |
| 2005/0256974 A1 | 11/2005 | Teodosiu et al. | |
| 2005/0261062 A1 * | 11/2005 | Lewin et al. .................. | 463/42 |
| 2005/0262167 A1 | 11/2005 | Teodosiu et al. | |
| 2005/0282636 A1 * | 12/2005 | O'Brien ....................... | 463/42 |
| 2006/0047855 A1 | 3/2006 | Gurevich et al. | |
| 2006/0155674 A1 * | 7/2006 | Traut et al. ..................... | 707/2 |
| 2007/0011145 A1 * | 1/2007 | Snyder .......................... | 707/3 |

FOREIGN PATENT DOCUMENTS

EP    1585350    10/2005

* cited by examiner

*Primary Examiner*—Firmin Backer
*Assistant Examiner*—Tobias J Casaw
(74) *Attorney, Agent, or Firm*—Van Pelt, Yi & James LLP

(57) ABSTRACT

Transferring data is disclosed. An indication to transfer an executable set of data to a destination device is received. A first set of data is transferred to the destination device. Transfer of a second set of data to the destination device is initiated. The first set of data is associated with the second set of data and is usable independent of the second set of data. The executable set of data is transferred to the destination device based at least in part on the second set of data.

29 Claims, 10 Drawing Sheets

BOOTSTRAP APPROACHES TO DOWNLOADING DATA IN RESPONSE TO A DOWNLOAD INDICATION

BACKGROUND OF THE INVENTION

Downloading data from a remote device can take a long time. Downloaded data can include an application produced by a software company and distributed through the company's website. Software companies may wish to reduce the transfer time perceived by a user during a download. If a user thinks a download is taking too long, he may become impatient and cancel the process. This may result in the latest version of the software company's application not being distributed to all interested users. Improved methods of downloading data would be useful.

BRIEF DESCRIPTION OF THE DRAWINGS

Various embodiments of the invention are disclosed in the following detailed description and the accompanying drawings.

DETAILED DESCRIPTION

Figure 1:
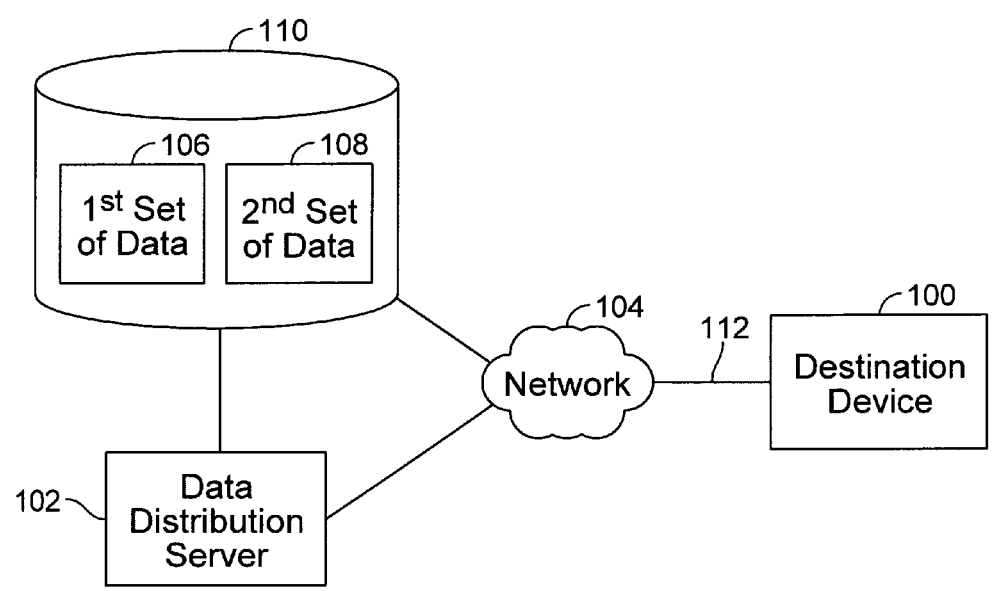
FIG. 1 is a system diagram illustrating an embodiment of a distributed system that downloads first and second sets of data.

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Transferring data is disclosed. An indication to transfer an executable set of data to a destination device is received. A first set of data is transferred and transfer of a second set of data is initiated. The first set of data is associated with the second set of data. In some embodiments, the first set of data in combination with the second set of data is equivalent to the executable set of data. The first set of data is usable independent of the second set of data. Usable independent of the second set of data may vary based on what the first and second sets of data comprise of. In some embodiments, the first set of data supports basic functions associated with an application; the first set of data may be used to perform these basic functions while the second set of data is being transferred. The executable set of data is transferred to the destination device based at least in part on the second set of data. Transferring the first set of data in some embodiments is faster than transferring the executable set of data.

In some embodiments, the sets of data can be grouped into a plurality of sets instead of the 2 sets described in this application. The second set of data may be completely independent of the first set of data. For example, an application such as Adobe Acrobat® Reader may be delivered in the first set, and a number of games may be delivered in the second set of data. The games may run independently of Adobe Acrobat® Reader (i.e., both can coexist on the same machine).

FIG. 1 is a system diagram illustrating an embodiment of a distributed system that downloads first and second sets of data. In the example shown, destination device 100 is a computer and a user of the computer wants to obtain an application. An older version of the application may already be located on destination device 100. To obtain the application, a first set of data 106 and a second set of data 108 are transferred from database 110 to destination device 100. Database 110 can include any storage area, such as a file system, or a variety of server scripts that generate information dynamically. First set of data 106 may be smaller than the desired application. To achieve this, the first set of data may support fewer features or functions compared to the desired application in its entirety. A code base may be associated with the entire application, and the first set of data may be associated with a portion of the same code base. As a result of the smaller size, transferring first set of data 106 may require less time than transferring the desired application in its entirety. The first set of data is usable independent of the second set of data 108, and a user may begin using the functions supported by the first set of data 106 once it is transferred to destination device 100. This enables a user to begin using at least some functions of the desired application rather than waiting for the entire application to be downloaded.

The second set of data 108 is used to provide a desired application in its entirety. Depending upon the implementation of the application, the second set of data 108 may include information contained in the first set of data 106, or may be mutually exclusive with respect to data 106. Once data 108 is transferred to destination device 100, the second set of data 108 may be used in combination with the first set of data 106 to obtain the complete, desired application. In some cases, the second set of data 108 is the desired application, and the first set of data 106 is redundant and no longer needed.

Initially transferring the first set of data 106 may be useful in some scenarios. Some destination devices have a slow connection to network 104. For example, connection 112 may be a dial up connection using a 56 kbps modem. With such a slow connection, even transferring moderate amounts of data may require more time than is preferred. Applications are also growing larger and larger. Even with a relatively fast connection, downloading some applications may require a considerable amount of time.

Data distribution server 102 manages transfer of the first and second sets of data 106 and 108. In some embodiments, data distribution server 102 is implemented as a web server. To access server 102, a user at destination device 100 may run an Internet browser application, such as Microsoft® Internet Explorer or Mozilla™ Firefox®, installed on destination device 100. Using the Internet browser, a user may access a particular website associated with data distribution server 102, specified by a Uniform Resource Locator (URL). Once in communication with data distribution server 102, the user may indicate his intent to download a particular application.

In some embodiments, an older version of the desired application is installed on destination device 100. Using the older version installed, a user may push a button or selection an option from a pull down menu that is associated with updating the application. This may trigger an indication to be sent to data distribution server 102 via network 104.

Transfer of the first set of data 106 may commence once an indication is received by data distribution server 102. Via network 104, first set of data 106 is transferred from database 110 to destination device 100. Data distribution server 102 is in communication with database 110 and may direct database 110 to download data 106. A download task running on destination device 100 may work with one or more counterpart tasks to download data from database 110 to destination device 100. Other appropriate methods to manage transfer of data for a particular configuration may be used.

Although a distributed system is shown in this example, a distributed system is not a requirement. In some applications, data is transferred from a storage medium to a destination device using a device drive. For example, a user may install an application stored on a compact disc. A first set of data may be transferred from the disc to enable a user to begin using at least some features of the application prior to obtaining the full version of the application. While the user is using the first set of data, the second set of data may be read from the compact disc. The destination device and a device storing the first and second sets of data may be directly coupled to each other.

Figure 2:
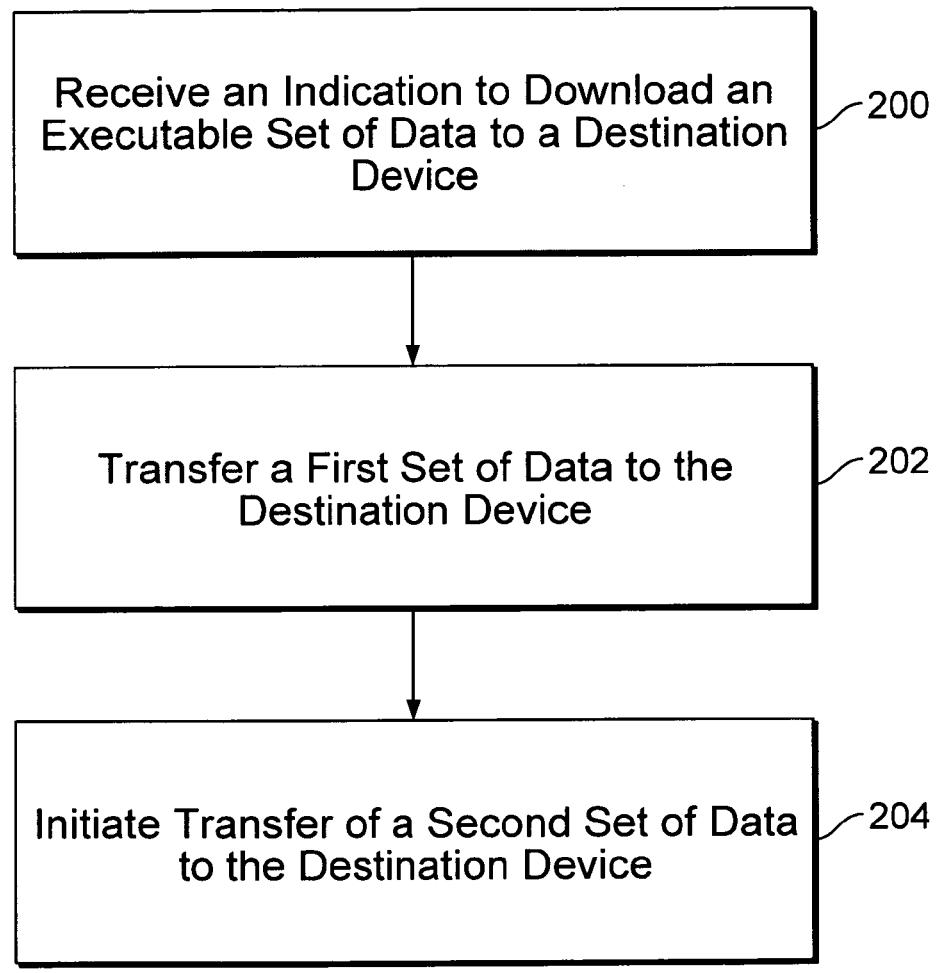
FIG. 2 is a flowchart illustrating an embodiment of downloading a first set of data and a second set of data.

FIG. 2 is a flowchart illustrating an embodiment of downloading a first set of data and a second set of data. In the example shown, the first set of data is usable independent of the second set of data and both sets of data are associated with an application. A first set of data and a second set of data may comprise a variety of data. The first and second sets of data may be associated with applications that create and/or manipulate data, such as modeling software, document applications, or games. The first and second sets of data may include an operating system or a file, such as help files, HTML files, or audiovisual files. These are some examples; the first and second sets of data can comprise of other things.

At 200, an indication to download an executable set of data to a destination device is received. The executable set of data may include an application, computer executable code, commands, or instructions. The executable set of data may run on an environment in the destination device. For example, the executable set of data may be an application that runs in an operating system environment of the destination device.

In one example of 200, an indication to download the latest version of an application is received. In some embodiments, it is determined whether to download the first and second sets of data individually, or to download the executable set of data in a single transfer. The determination may be based on queries presented to the user. Some queries do not reveal that multiple sets of data potentially could be downloaded. For example, a query may ask, "Are you using a dial up connection?" In other cases, a query may ask, "Would you like a faster download of an initial copy to get you started?" In some embodiments, a user's preference is preconfigured, perhaps from a previous download. A change in a user's response may correspondingly change a stored preference. In some cases, queries are not used and a task running on a destination device collects information used in the determination. For example, in the background (transparent to the user), the data rate over a network to a destination device may be determined. This information may be used to decide whether to download the first and second sets of data separately, or download the executable set of data in one transfer.

Interfaces presented to a user may be designed for a variety of levels of user awareness or user interaction regarding the download process. In some embodiments, a user is unaware that a first set of data and a second set of data are downloaded as opposed to a single transfer of the executable set of data. Similarly, there may be few or no queries asking the user for information or to perform a requested action. In some embodiments, the interface initially operates in a mode where downloading the first and second sets of data is transparent to the user. Advanced users may have the option of entering modes where the user receives more information regarding the download process and/or has more control. By pushing a button for advanced users, a different download interface for advanced users may be presented.

At 202, a first set of data is transferred to the destination device. The first set of data may be stored remotely from the destination device and transferred via a network, or a separate device with the first set of data and the destination device may be directly coupled. The first set of data may be transferred from a separate device coupled to the destination device using a connection, for example by using a USB port, a PCI interface, a serial port, an infrared connection, or a wireless Bluetooth® connection. A drive such as a floppy disk drive or a compact disk drive may alternatively be used.

In some embodiments, the first set of data can include one of multiple sets of data and the indication may identify which set is selected. A user may have some degree of control over which set of data is initially transferred. For example, a user may be able to select which functions or features are included in the first set of data. This may be completely customizable by the user. Each function may be presented to the user, and the user may select exactly which functions to include in the first set of data.

In some embodiments, a limited number of choices are predetermined and presented to the user. A user may select the first set of data from the choices presented. This may be useful in implementations that generate the first set of data, for example by compiling the first set of data from a code base. Predetermined choices may be associated with general profiles of users. A novice profile and an expert profile may be defined, where a novice user is anticipated to use only a few features of the application. The expert profile may be anticipated to use more features than the novice profile. Historical data regarding which functions are accessed most frequently may be used to determine a first set of data associated with a profile. Other types of user profiles may be defined. For example, a content generator profile may be associated with editing functions whereas a content consumer profile may be associated with printing functions. A user may choose to download a first set of data associated with a particular profile and an indication may include this information.

Transfer of a second set of data to the destination device is initiated at 204. Transferring the second set of data may be transparent to a user. That is, a notification may or may not be sent to the user regarding transfer of the second set of data. If the first set of data is being used, transferring the second set of data does not interrupt usage of the first set of data. A user may run an initial version of an application supported by the first set of data while the second set of data is downloading in the background. A task or other executable may be running on the destination device to assist in the transfer.

Transfer of the second set of data may begin at a variety of times. In some embodiments, transfer of the second set of data is triggered once the first set of data is downloaded. This may be attractive in some applications since only one transfer needs to be managed at a time, and the first set of data does not share network resources with the second set of data. Transfer of the second set of data may even begin after the first set of data is in use at a destination device. In other embodiments, transfer of the first and second sets of data overlap. Downloading the second set of data may begin at the same time as the first set of data, or may begin in the middle of downloading the first set of data. If the first set of data is relatively small or a relatively fast connection is used, a user may not be able to perceive the difference between downloading the first set of data alone and simultaneously downloading the first and second sets of data. In some cases, traffic sent over network adapters is analyzed to determine network traffic associated with the destination device. If there is available bandwidth, transfer of the second set of data begins. In some devices, all traffic to or from the network passes through the network adapters, so analyzing traffic at the network adapter may be an accurate and convenient way to measure traffic.

In some embodiments, transfer of the second set of data at 204 may be interrupted or paused. A variety of conditions may cause the transfer to be interrupted. In some cases, a connection to a network is disabled. A user may disconnect a dial up connection or unplug an Ethernet cable and interrupt transfer of the second set of data. In some cases, available bandwidth is monitored or estimated. If the available bandwidth is below a threshold, transfer of the second set of data may be paused. Downloading the second set of data may resume when there is sufficient available bandwidth. The same threshold or a different threshold may be used to determine when to resume downloading. For efficiency, downloading may resume at or near the point at which it was interrupted so that data transmitted before an interruption does not need to be retransmitted.

Figure 3:
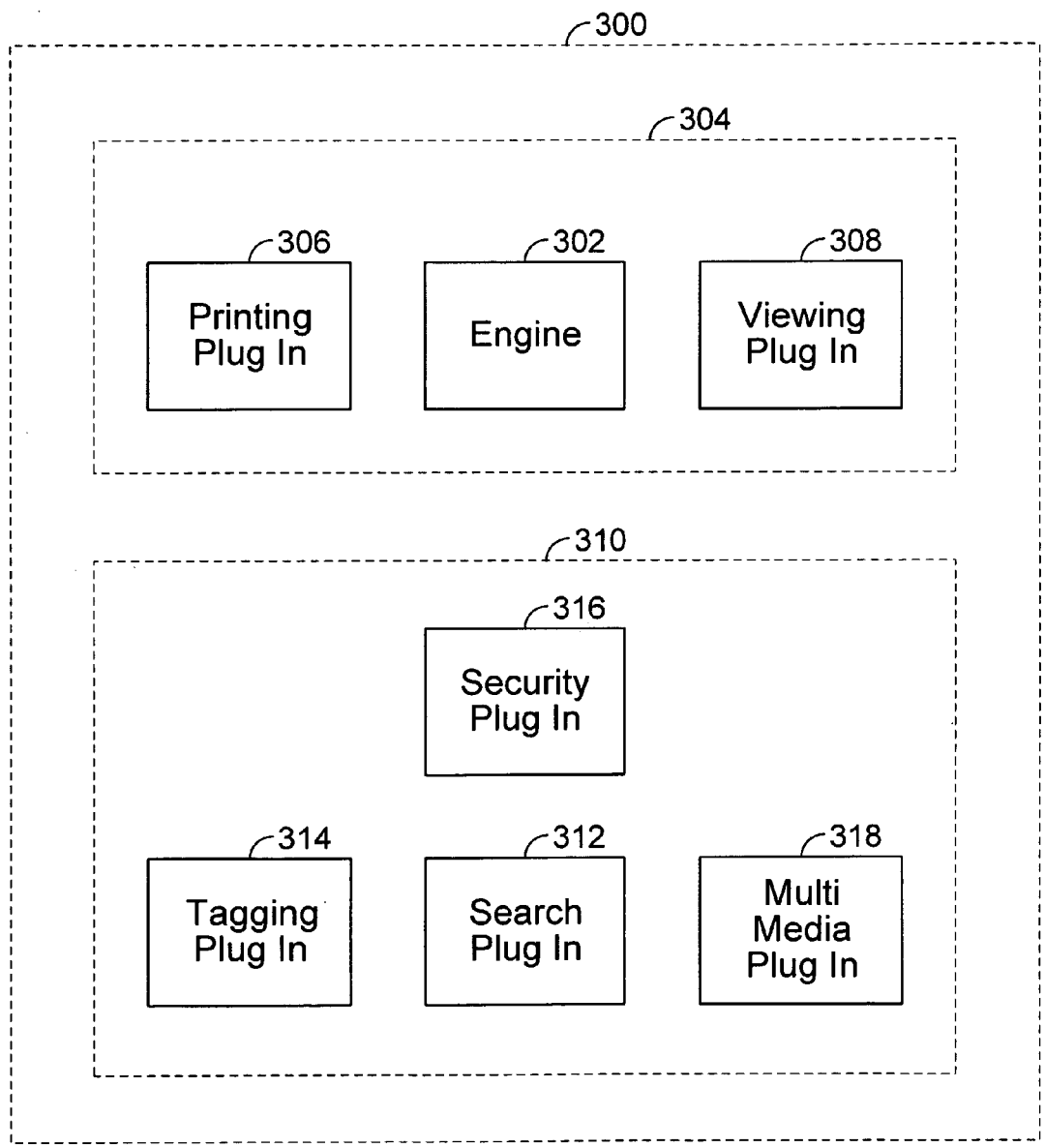
FIG. 3 is a diagram illustrating an embodiment of a first and second set of data associated with a plug-in application.

FIG. 3 is a diagram illustrating an embodiment of a first and second set of data associated with a plug-in application. In the example shown, application 300 comprises engine 302 and multiple plug-ins. Application 300 may be a software application such as Adobe Acrobat Reader® or Adobe Photoshop®. Each plug-in may be associated with a particular function or feature. The scope and definition of each plug-in may be implementation dependent and may vary from application to application. Each plug-in functions independently of any other plug-in. That is, one plug-in does not require another plug-in to operate. Engine 302 detects and loads available plug-ins. If a particular plug-in is not loaded, the functionality associated with that plug-in may not be available.

An indication to download application 300 to a destination device is received. In response to the indication, first set of data 304 is transferred to the destination device. With first set of data 304 on the destination device, the user does not have to wait for all plug-ins of application 300 to be transferred before using at least some of the features of application 300. In some cases, the first set of data transferred is approximately $\frac{1}{10}$ to $\frac{1}{8}$ the size of the entire application. First set of data 304 includes printing plug-in 306 and viewing plug-in 308. Viewing plug-in 308 may be used to open a file and present a visual display of the file to a user. Printing plug-in 306 may manage communications with a printer and generate an appropriate bit stream for a selected printer. Viewing plug-in 308 and printing plug-in 306 enable a user to perform basic functions on a file. The first set of data 304 also includes engine 302.

The second set of data 310 includes the rest of the plug-ins. In this example, the first set of data and second set of data do not have any information in common. Search plug-in 312, tagging plug-in 314, security plug-in 316, and multimedia plug-in 318 are included in the second set of data and are associated with more sophisticated functions. Search plug-in 312 may support search features of the application and may, for example, allow a user to locate a specified word or phrase within a file. Tagging plug-in 314 may enable a user to view or add tags to a file. Tags may include metadata used to classify the file, or may be a reviewer's comments displayed with the document. Security plug-in 316 may be associated with security functions such as adding password protection to a file. Multimedia plug-in 318 supports multimedia capabilities of application 300. Links to websites or audiovisual clips may be added or manipulated using multimedia plug-in 318.

Once first set of data 304 and second set of data 310 are transferred to a destination device, all of application 300 has been transferred. Depending upon the implementation of application 300, first set of data 304 may need to be restarted if it is in use to detect second set of data 310. For example, if first set of data 304 is a version of Adobe Acrobat® Reader with basic functionality and is in use, second set of data 310 may not be detected until the basic Reader is restarted. A message may be presented to a user suggesting that the basic Reader be restarted to enable the complete Reader. The user may subsequently close the basic Reader at a time of her choosing. Alternatively, the second set of data can be detected for use (without prompting the user) when the user starts the application the next time after the second set of data has completely downloaded.

Other applications may be able to detect and load second set of data 310 without closing first set of data 304. In some cases, the destination device needs to be restarted. For example, if an operating system update is requested, some resources associated with detecting a second set of data may be locked. To make the locked resources available, a destination device may be restarted. Some examples of locked resources include a device driver, a system service, and a control file.

A variety of messages may be presented to the user after second set of data 310 is transferred to a destination device. Alerts and requests presented may depend on how application 300 is implemented, or how second set of data 310 is enabled once it is transferred. For example, some of the queries may be based on how plug-ins in second set of data 310 are enabled while first set of data 304 is in use. The number and content of messages presented may be based on a desired degree of transparency with respect to the user. In some embodiments, transferring first set of data 304 and second set of data 310 may be completely transparent to the user and no message is presented after second set of data 310 is transferred.

Figure 4:
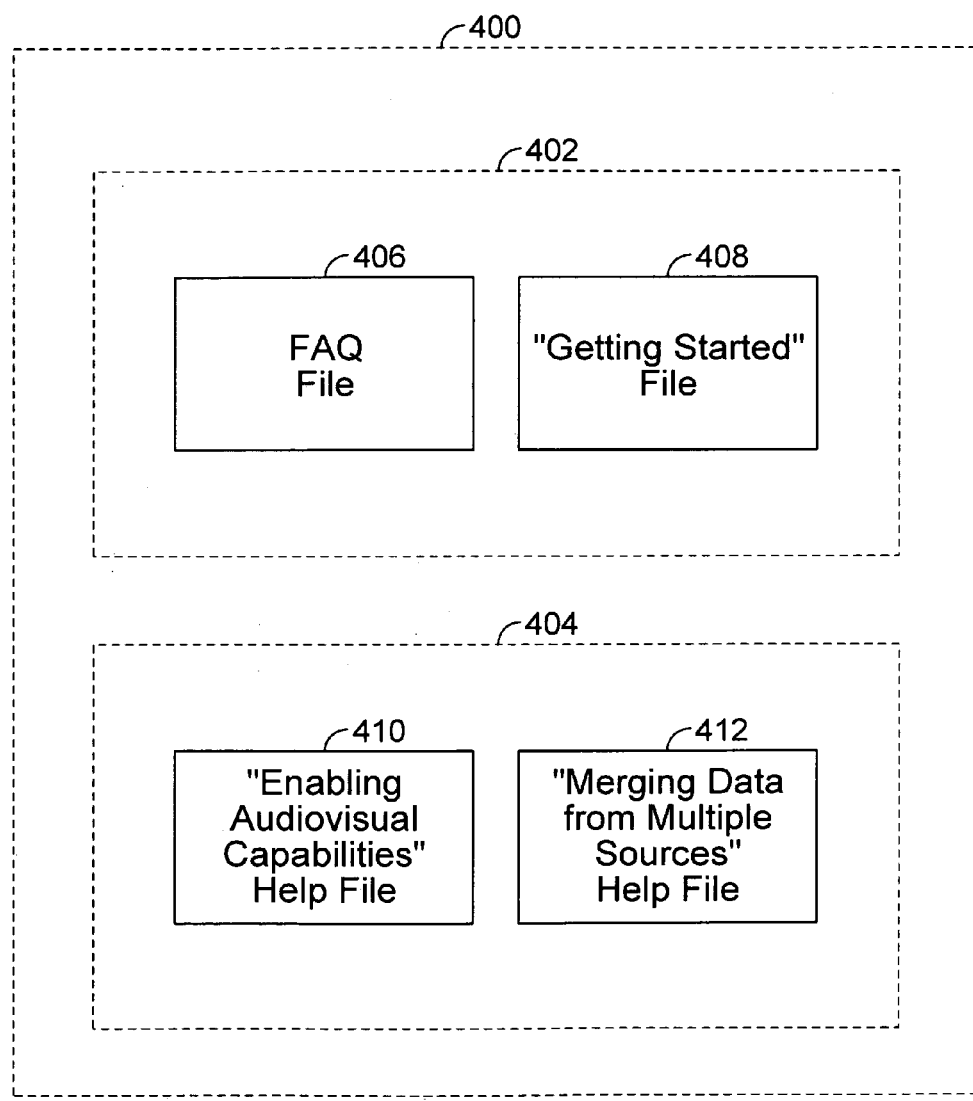
FIG. 4 is a diagram illustrating an embodiment of a first and second set of data associated with help files.

FIG. 4 is a diagram illustrating an embodiment of a first and second set of data associated with help files. In the example shown, an indication is received from a destination device that collection 400 is desired. Group 1 402 and group 2 404 are transferred to the destination device in response to the indication. Transfer of the two groups may or may not overlap. Group 1 402 and group 2 404 do not include any help files in common. In some embodiments, the two groups of data overlap or one group is a subset of the other group.

Group 1 402 includes FAQ file 406 and "getting started" help file 408. Of the help files, files 406 and 408 are two of the most commonly accessed files. Files 406 and 408 may also tend to be the first help files that are accessed. When determining which help files to include in group 1 402, historical information regarding usage may be used in the selection process. With group 1 402 on the destination device, the help files most likely to be accessed are available and a user or application may begin using at least some of the help files in collection 400.

Group 2 404 includes "enabling audiovisual capabilities" help file 410 and "merging data from multiple sources" help file 412. Help files 410 and 412 may not be accessed as frequently as help files 406 and 408. After group 1 402 and group 2 404 are transferred, all of collection 400 is available at the destination device.

Transfer of group 1 402 and group 2 404 may be transparent to a user. After group 1 402 is transferred to the destination device, a message may be presented to the user that help files are available. The message may not necessarily indicate that some or all of group 2 404 has yet to be transferred. If a user accesses a help file associated with group 2 404 while group 2 404 is still being transferred, a variety of messages may be presented to a user. In some cases, an older version of a particular help file exists on the destination device. The older version may or may not be presented to a user depending on the difference in content between the two versions. For example, the older version may include information that is erroneous or out of date, and it may be undesirable to use this information. In some embodiments, the application may indicate to the process downloading group 2 that it is a higher priority; an application may tell a user to check back later. When the application detects that group 2 is downloaded, it can give a visual cue to the user to indicate the requested functionality is now available. The requested help page is not presented and the current display of the user interface is maintained.

Figure 5:
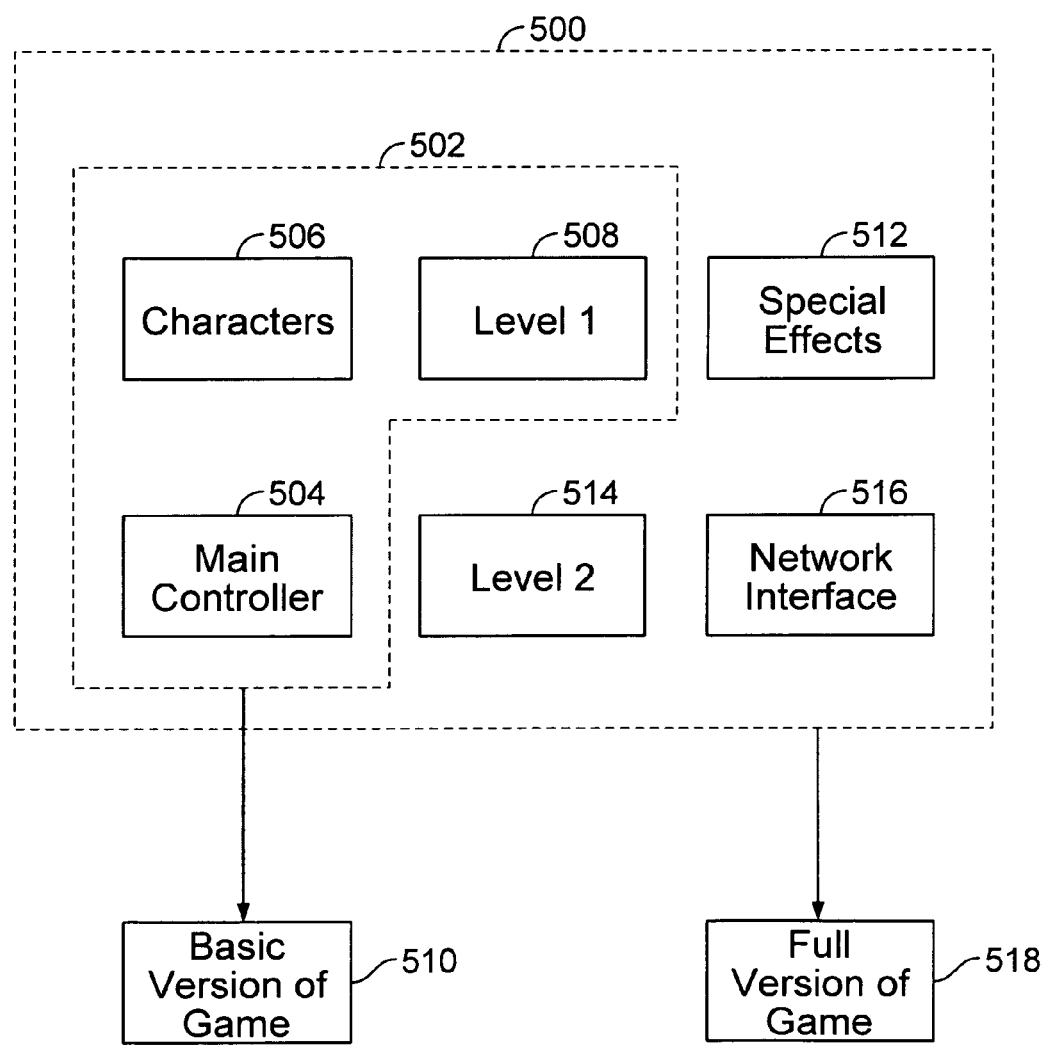
FIG. 5 is a diagram illustrating an embodiment of two versions of a game generated from two sets of code modules.

FIG. 5 is a diagram illustrating an embodiment of two versions of a game generated from two sets of code modules. In the example shown, code base 500 is associated with a game and includes code modules. Each code module is associated with a particular aspect of the game. Subset 502 includes characters module 506, level 1 module 508, and main controller module 504. Characters module 506 includes information about characters in the game. Players begin in a first level of the game, and information associated with the first level is included in level 1 module 508. Main controller 504 is the main controller associated with the game. These modules are included in subset 502 and are used to generate a basic version 510 of the game.

To generate the basic version of the game, subset 502 may be compiled. Information in addition to subset 502 may be used to generate basic version 510. For example, instructions associated with uncompressing, creating new directories in a file system, and moving files may be included in basic version 510. The same process and the same additional instructions may be used to generate full version 518.

Full version 518 is generated using all code modules in code base 500. Basic version 510 is smaller in size than full version 518 and in some cases is significantly smaller. Modules not included in subset 502 are used to generate full version 518. Special effects module 512 may include audio or visual effects for the game. Network interface module 516 manages network communications to play with other players over a network. Level 2 514 includes information associated with the second level of the game.

Basic version 510 is transferred to a destination device which may be a computer, cellular phone, Personal Digital Assistant (PDA), portable game player, or other device capable of running a game. Once the basic version is located on the destination device, basic version 510 may be uncompressed and moved to an appropriate file location in a file system of the destination device. With basic version 510, a user can begin playing the first level of the game.

Full version 518 may be transferred to the destination device while a user plays the first level using basic version 510. After full version 518 is transferred, it is installed on the destination device. If a user is playing the basic version, some resources associated with the game may be locked. To make locked resources available, the basic version of the game may need to be closed. A message may be presented to the user indicating that the full version of the game is available and the basic version should be closed. Once the locked resources are available, appropriate steps may be performed to install full version 518. Full version 518 in some embodiments completely replaces basic version 510. With full version 518 installed, the remaining features not included in subset 502 are available. A user can experience the game's special effects or play with other people over a network. The user can also progress to the second level (or even higher) of the game. In some cases, basic version 510 is deleted from a destination device after full version 518 is installed. This may release storage for other uses.

Versions 510 and 518 of the game may be generated prior to receiving an indication to transfer a game. Instead of having to wait for the different versions of the game to be compiled, basic version 510 can be generated in advance and ready for transfer. Alternatively, basic version 510 may be generated after an indication is received. Basic version 510 may be generated after determining which code modules to include in subset 502. Some modules (such as characters 506 and main controller 504) may be mandatory, and a user may select additional modules to use during generation of basic version 510. An indication or another communication may be used specify which modules to include in addition to any mandatory modules.

Figure 6:
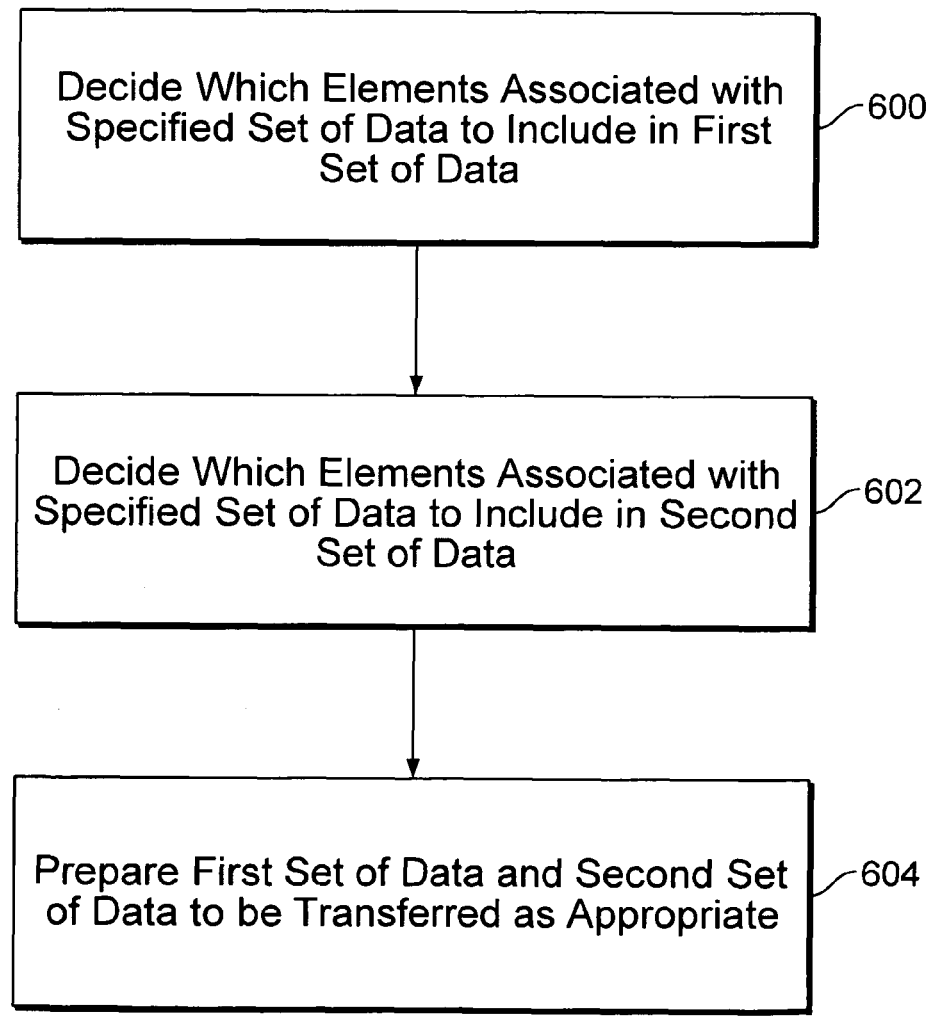
FIG. 6 is a flowchart illustrating an embodiment of preparing a first set of data and a second set of data to be transferred.

FIG. 6 is a flowchart illustrating an embodiment of preparing a first set of data and a second set of data to be transferred. In the example shown, the first set of data and the second set of data are transferred in response to a request for a specified set of data. It is decided at 600 which elements associated with a specified set of data to include in a first set of data. A variety of factors may be considered in deciding which elements of the specified set of data to include. Some elements may be necessary for the first set of data to be used and are included in the first set of data. A desired size of the first set of data may be considered. Usage of elements or associated functionality may be considered. Elements that are frequently used or elements that are associated with a basic feature or function of the specified set of data may be included.

At 602, it is decided which elements associated with a specified set of data to include in a second set of data. The elements included in the second set of data may depend on the first set of data and/or the specified set of data. In some cases, the second set of data supplements the first set of data. The second set of data in such cases may be the specified set of data minus the first set of data, as is the case for application 300 which comprises of plug-ins. In some cases, the second set of data replaces the first set of data. The second set of data may be the specified set of data, as is the case for application 500 comprising of code modules.

The first set of data and the second set of data are prepared to be transferred as appropriate at 604. In some embodiments, processing is performed on the first and second sets of data. For example, one or both of the sets of data may be compiled, compressed, encrypted, organized, or tagged. The processing performed may assist or improve transfer of the processed data (for example using compression or encryption) or usage of the transferred data at the destination device (for example by tagging or organizing data). In some embodiments, additional information is added to the first or second set of data. For example, a script may be included in the second set of data. Once on the destination device, a script may remove an older version of the requested data, remove the first set of data, or install the specified set of data.

The illustrated process may be performed at a variety of times. In some cases, the first and second sets of data are prepared prior to receiving a request for the specified set of data. This may be desired in applications where preparation at 604 adds a noticeable delay to the transfer time. To reduce the transfer time, the first and second sets of data may be pre-generated and stored for transfer. In other cases, the process is initiated once a request for the specified set of data is received. This may reduce an amount of storage needed in some applications. For example, preparation at 604 may generate a bit stream that is quickly transmitted. Only a small portion of the bit stream at most is stored.

A plurality of first and/or second sets of data may be prepared. In one example, a request to transfer a collection of audio files is received. Although the entire collection is requested, a listener may wish to hear certain audio files first. These audio files may be specified in the request and the first set of data may include the specified files. A second listener may request the same collection of audio files but wish to hear different audio files first. The first set of data prepared for the second listener may be different compared to the first set of data prepared for the first listener. Preferences for a user may be stored. The next time the user requests a collection of audio files, the stored preferences may be used to select data to include in the first set of data. The selected set of data may be presented to the user and the user may add or delete items.

Figure 7:
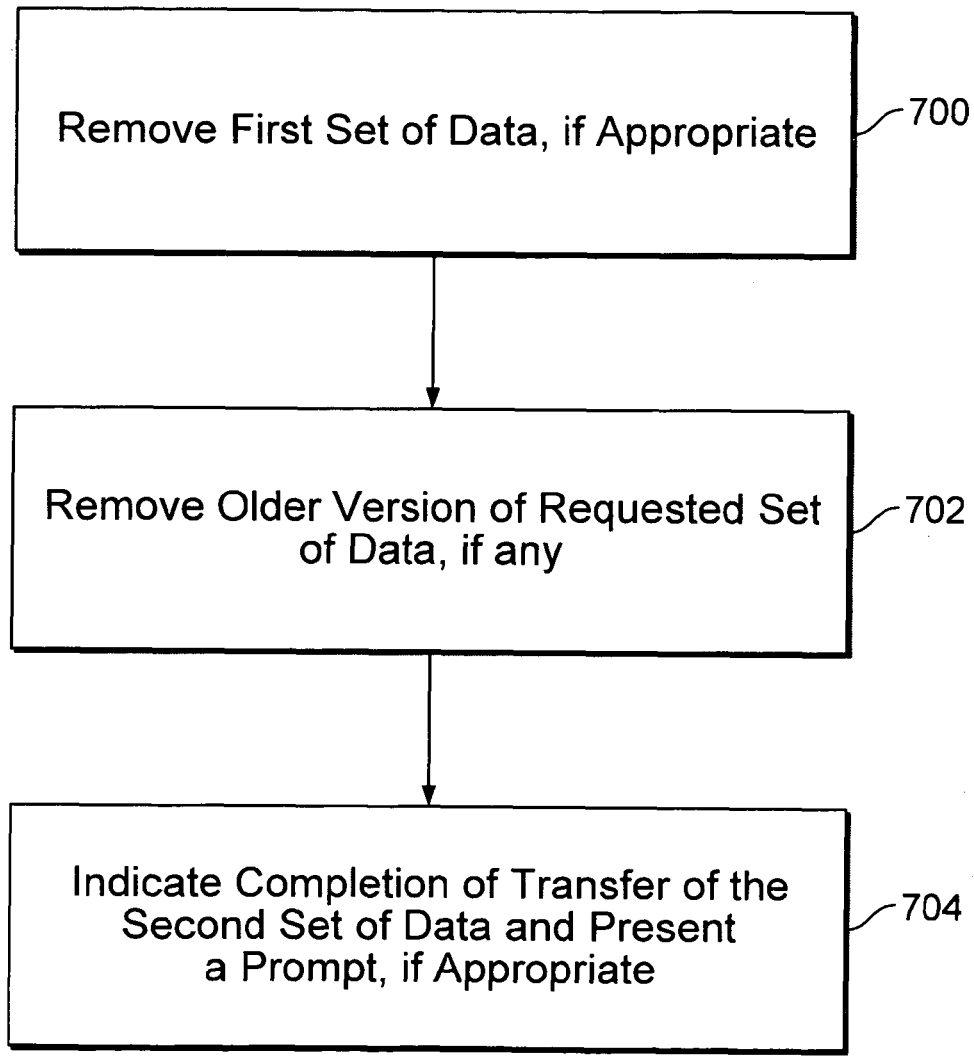
FIG. 7 is a flowchart illustrating an embodiment of setting up a second set of data at a destination device.

FIG. 7 is a flowchart illustrating an embodiment of setting up a second set of data at a destination device. In the example shown, the process is performed after a second set of data is transferred to a destination device. At 700, a first set of data is removed, if appropriate. Depending on how a requested set of data is implemented, a second set of data may include all of the requested set of data. Once the second set of data is transferred, the first set of data may no longer be needed and may be removed. In other embodiments, the first set of data is supplemented by the second set of data and the first set of data is used even after the second set of data is transferred.

An older version of the requested set of data, if any, is removed at 702. A destination device may already have an older version of the requested data and it may be unnecessary to have both copies stored on the destination device. The older version may be obsolete or a user may not use an older version if a newer version is available. In some embodiments, an older version of the requested data is maintained on a destination device.

At 704, completion of transfer of the second set of data is indicated and a prompt is presented, if appropriate. Whether or not an indication and/or prompt are presented may depend on a variety of factors, such a desired degree of transparency to a user or how the transferred second set of data is activated. The indication and prompt may be presented through a user interface. A prompt may be associated with making the transferred second set of data available. To do so, access to a control file, device register, process or other resource may be needed. If a resource is locked, the prompt may be directed towards unlocking the resource and may depend on what resources are needed.

In some embodiments, an indication associated with completing transfer of the second set of data is not generated. In some embodiments, a prompt is not generated.

Figure 8:
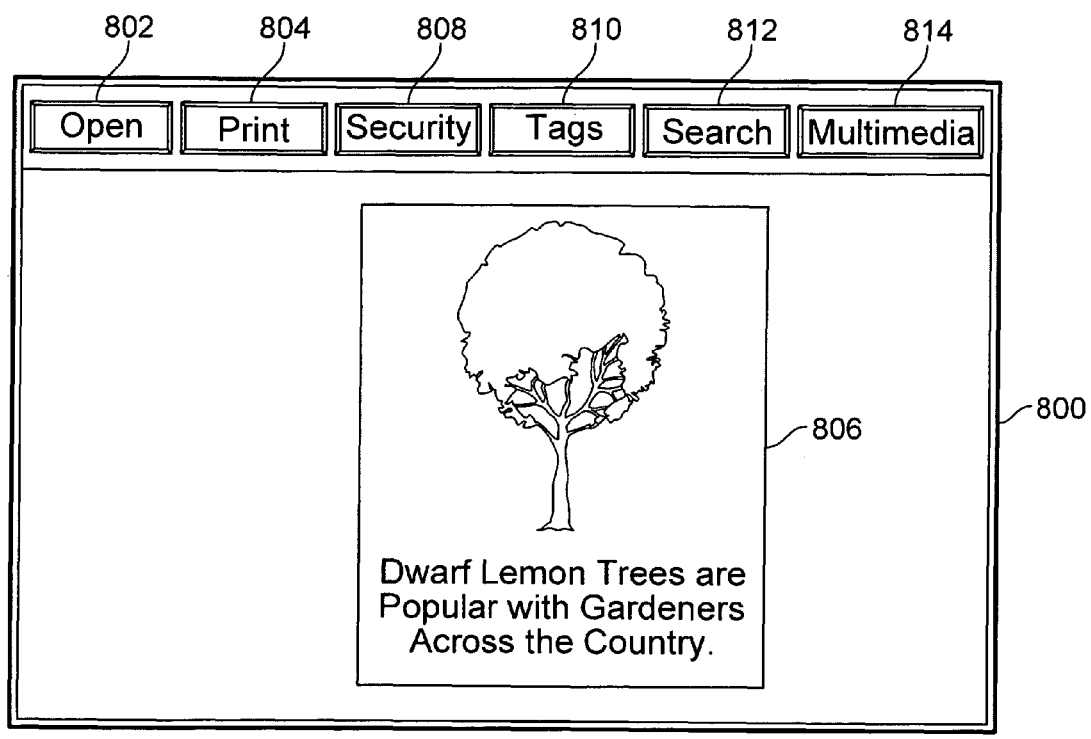
FIG. 8 illustrates an embodiment of a user interface used with a first and second set of data.

FIG. 8 illustrates an embodiment of a user interface used with a first and second set of data. In the example shown, user interface 800 is a common interface used with a basic version, corresponding to first set of data 304, and a full version of an application, corresponding to application 300. First set of data 304 and second set of data 310 are transferred to a destination device. Interface 800 may be a window presented to a user. A destination device may be a computer that has a monitor to present visual information to a user and interface 800 may be displayed on the monitor. Interface 800 includes a variety of buttons. Each button may have with multiple functions associated with it. To access the functions, an input device to the destination device (such as a mouse or a keyboard) may be used to select a button and activate a pull down menu of functions. The input device may then be used to select one of the functions from the pull down menu.

Each button is associated with a particular plug-in of application 300. With the first set of data 304 transferred to a destination device, a user may open and print files via interface 800. Open button 802 and print button 804 are associated with viewing plug-in 308 and printing plug-in 306, respectively. Functions associated with each button are supported by the corresponding plug-in. To open and view a file, a user may select open button 802. Document 806, which includes text and an image, is displayed in interface 800 using viewing plug-in 308. To print document 806, print button 804 may be selected and printing plug-in 306 is used.

The remainder of the buttons are associated with the second set of data. Security button 808, tagging button 810, search button 812, and multimedia button 814 are associated with security plug-in 316, tagging plug-in 314, search plug-in 312, and multimedia plug-in 318, respectively. While second set of data 310 is being transferred to a destination device, functions associated with these buttons may not be supported. For example, if a user selects security button 808 while second set of data 310 is being transferred, security related functions may not be available. Interface 800 may be unresponsive to the selection, or may present a message indicating that the user's selection is unavailable.

Once second set of data 310 is transferred to a destination device, interface 800 may be restarted to detect plug-ins included in the second set of data of data if needed. A request may be presented to a user asking the user to close interface 800. A user may opt to close interface 800 at that point, or ignore the request and close the interface later. Interface 800 may be reopened and all functions associated with application 300 are supported by first set of data 304 and second set of data 310. In some embodiments, plug-ins included in second set of data 310 are capable of being detected and activated without closing interface 800.

Using a common interface such as interface 800 can be useful in maintaining transparency with respect to a user.

Since the same interface is used for both the basic version and the full version of an application, the user may not realize that a first and a second set of data of data are downloaded.

Interface 800 illustrates one example of an interface that may be used; other embodiments may use a different interface compared to interface 800. In some embodiments, the organization or presentation of information may be different. For example, some interfaces may not present a button or a selection from a pull down menu until corresponding data is downloaded. In some embodiments, other input devices such as a stylus, a voice activated input device, or an input device responsive to a user's body movement may be used to interact with interface 800.

Figure 9:
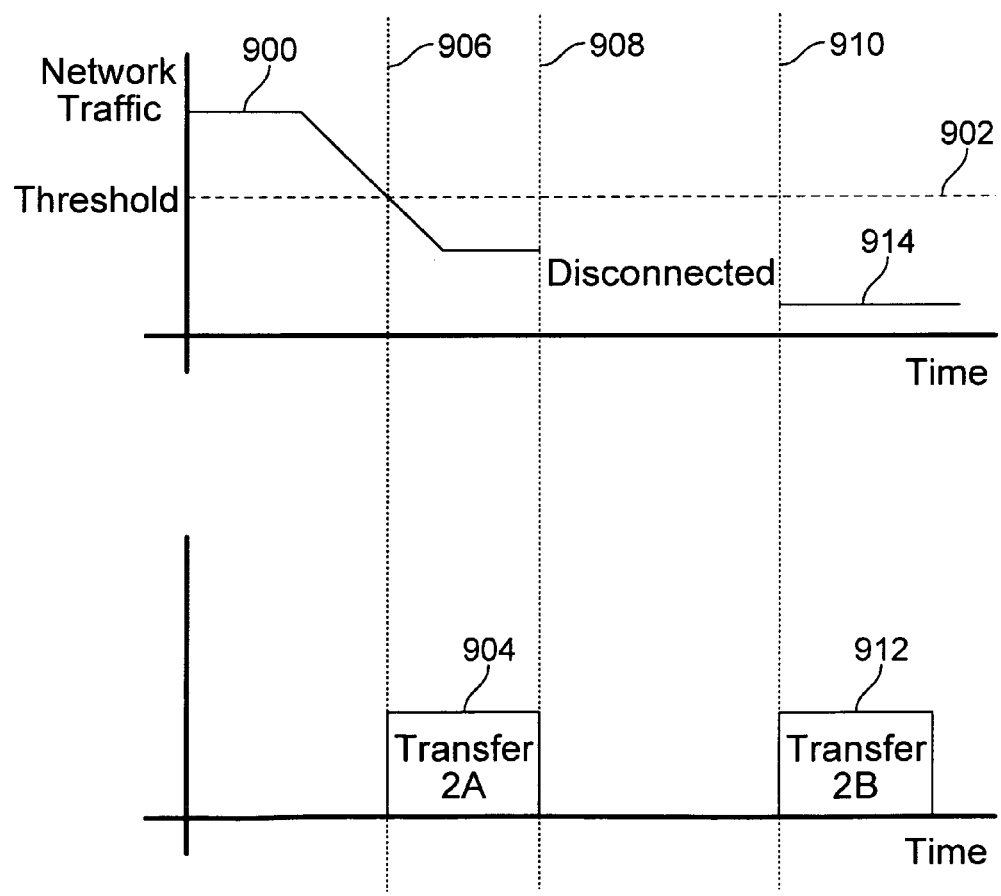
FIG. 9 is timing diagram illustrating an embodiment of a transfer of a set of data based on network traffic.

FIG. 9 is timing diagram illustrating an embodiment of a transfer of a set of data based on network traffic. In the example shown, a second set of data is transferred to a destination device. In other embodiments, a first set of data is transferred to a destination device based on network traffic. Network traffic level 900 is the network traffic associated with the destination device, and may be from one or more applications running on the destination device. Network traffic level 900 may be obtained using a variety of means. In some operating systems, the operating system includes a process capable of measuring the network traffic and network traffic level 900 may be obtained from that process. In some cases, all applications on a destination device that access a network go through a network adaptor. Traffic at the network adaptor may be periodically monitored to obtain network traffic level 900.

Transfer 904 begins at time 906 when network traffic level 900 is below threshold 902. A second set of data is transferred to the destination device during transfer 904. The second set of data may or may not contain information transferred with a first set of data. By using a threshold to determine when to transfer the second set of data, contention for network resources with other transmissions may be reduced or avoided completely. The level of threshold 902 may be set appropriately to reduce or avoid contention. In one example, a user may be downloading large video files to his computer and network traffic level 900 is high. The user may not wish to have transfer of the video files delayed by simultaneously transferring the second set of data. Transfer of the second set of data occurs when the videos are downloaded and network traffic level 900 drops below threshold 902.

Transfer of the second set of data is interrupted at time 908 when a connection to the network is disconnected. For example, a user may be using a dial up connection to access the network. At time 908, the user may close the dial up connection and access to the network is unavailable. Some part of the second set of data remains to be transferred. At time 910, access to the network becomes available again. Network traffic level 914 is less than threshold 902 so transfer 912 begins. Rather than retransmitting information included in transfer 904, transfer 912 may begin where transfer 904 was interrupted. In some embodiments, some information is repeated in transfer 912. A communication may be exchanged between a client running on the destination device and server associated with transferring the second set of data. The process running on the destination device may communicate a point at which transfer 904 was interrupted. The server may use this information to determine what portion of the second set of data to download in transfer 912.

In some embodiments, transfer of a second set of data may be interrupted by the network traffic level. For example, if a user opens an interne browser application, such as Microsoft Internet Explorer® or Mozilla Firefox®, and views some web pages, the network traffic level may increase. If the traffic level exceeds a threshold, transfer of the second set of data may be interrupted. In some embodiments, the interruption is performed "gracefully." A client running on the destination device may communicate to a server to stop transferring the second set of data. The point at which transfer stops may be associated with some logical boundary within the second set of data. The client and/or the server may perform clean up processes and reset registers, states, or other control information associated with the transfer.

A time threshold is used in some embodiments to determine when to begin a transfer. For example, transfer 904 or transfer 912 may not begin unless the network traffic level is below threshold 902 for more than a certain amount of time. The network traffic level may only marginally be above threshold 902, and waiting some time before beginning a transfer may avoid false starts and stops.

In some embodiments, the second set of data is transferred without considering the network traffic level. A decision may be made whether or not to transfer the second set of data based on network traffic level. The size of the second set of data or the data rate of a network connection may be considered. For example, if the second set of data is relatively small or a network connection may support a large amount of traffic, transferring a second set of data irregardless of the network traffic level may only briefly or moderately affect other processes accessing the network.

Figure 10:
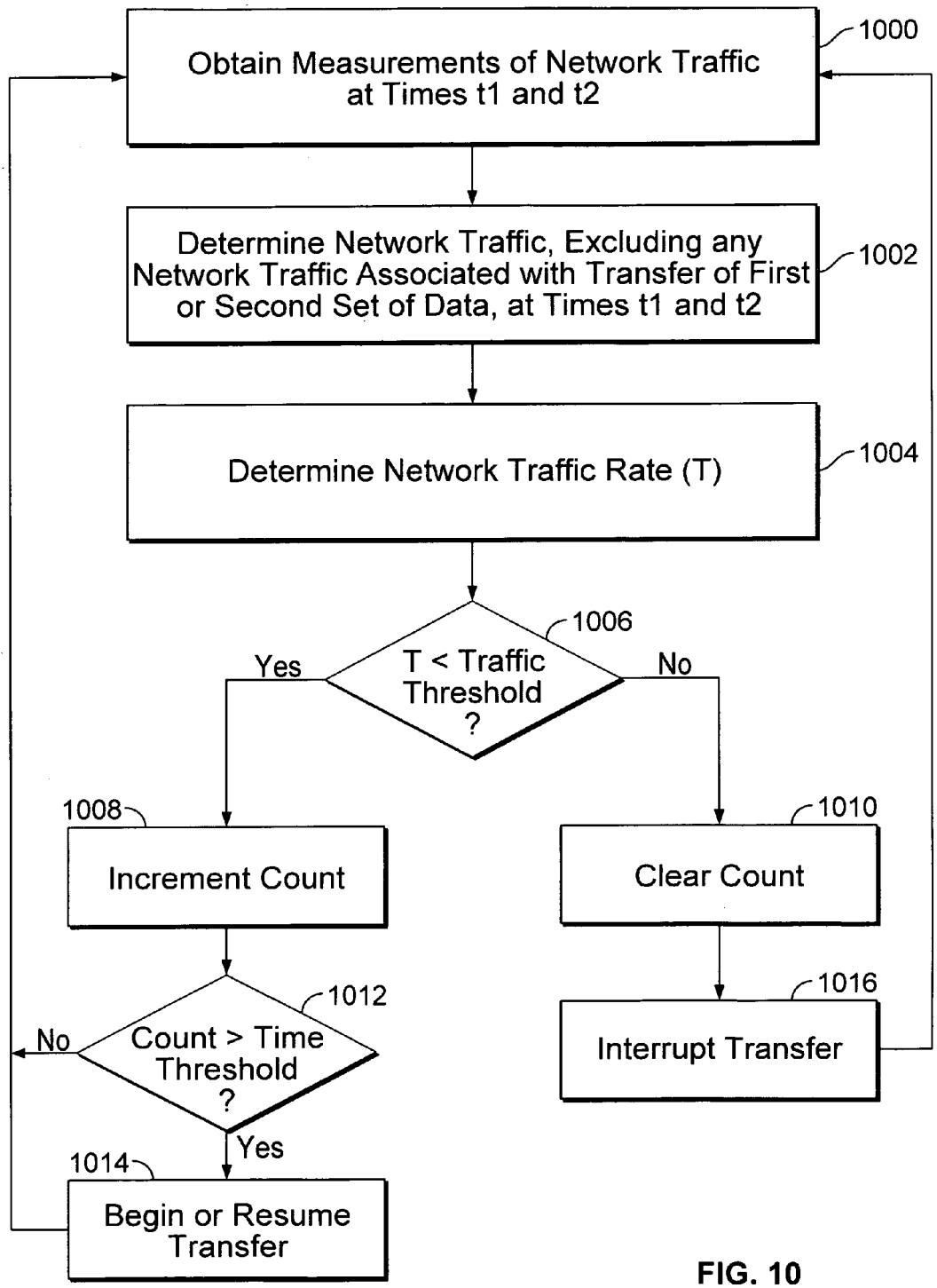
FIG. 10 is flowchart illustrating an embodiment of periodically sampling network traffic to determine when to transfer data.

FIG. 10 is flowchart illustrating an embodiment of periodically sampling network traffic to determine when to transfer data. In the example shown, the process may be used to determine when to transfer a first set of data or a second set of data. At 1000, measurements of network traffic at times at t1 and t2 are obtained. The measurement of network traffic may be in units of bytes and may be associated with a network adapter. In some cases, the process shown is an iterative process. The time t1 may be associated with a previous iteration and t2 may be associated with the current iteration. The measurement associated with t2 for this iteration may then become the measurement associated with t1 for the next iteration. That way, only one measurement is performed each iteration.

Network traffic, excluding any network traffic associated with transfer of the first or second set of data, at times t1 and t2 are determined at 1002. Outputs X1=B1−D1 and X2=B2−D2 may be generated, where B1 and B2 are the measurements at times t1 and t2 from 1000. D1 and D2 are associated with transfer of the first or second set of data and is excluded. D1, D2, X1, and X2 may be in units of bytes. Conceptually, outputs X1 and X2 may be thought of as the bytes transferred over a network adapter by other application running on the destination device.

In some embodiments, additional network traffic may be removed at 1002. Even if no applications are running on a destination device, there may be some network traffic. For example, Windows Internet Name Service (WINS) server lookups, Address Resolution Protocol (ARP) requests, and Internet Control Message Protocol (ICMP) pings may cause some network traffic. This type of network traffic may be referred to as noise and may be removed during the calculation at 1002. To determine how many bytes to attribute to noise and remove from the calculation, a series of measurements at idle times may be averaged to obtain a noise estimate. This noise estimate may be subtracted at 1002. Periodically, the amount of noise may be re-estimated.

At 1004, a network traffic rate (T) is determined. The network traffic rate may be determined using times t1, t2, and the determined network traffic from 1002. T may be (X2−X1)/(t2−t1) in units of bytes per second.

It is decided at 1006 whether T is less than a traffic threshold. A percentage of a maximum network traffic rate may be used to describe the traffic threshold. If not, a count is cleared at 1010. The count is the number of consecutive times that T is less than the traffic threshold. The process may be an iterative process and at each iteration the count may be incremented or cleared. The network traffic T is above the threshold and other applications may be accessing the network. At 1016 transfer is interrupted. Interrupting transfer may include a client on a destination device communicating to a server to stop transfer. The process returns to 1000 to obtain measurements of network traffic.

If T is less than the traffic threshold, the count is incremented 1008. It is decided at 1012 whether the count is greater than the time threshold. The time threshold may be expressed in number of iterations or in units of time. If a more aggressive download is desired, a lower time threshold may be used. A higher time threshold may result in less false starts and stops, but may increase the download time. In some embodiments, the requested data is evaluated to determine the priority of the download. In one example, the requested data includes a security patch for a malicious computer virus. The download of the patch is important and the threshold may be set to a very high level. The transfer may begin sooner and have fewer interruptions. Requested data with a lower priority may have a threshold level that is set to a lower value.

If the count is less than a time threshold, the process returns to 1000 to obtain measurements of network traffic. Although the network traffic rate is lower than the traffic threshold, it has not been below the traffic threshold for a sufficiently long enough period to start or resume a transfer. If the count is greater than the time threshold, transfer begins or resumes at 1014. A transfer may resume at the point at which transfer was interrupted. Data transferred at 1014 may be a first set of data or a second set of data associated with a desired application. A variety of information, including games, audiovisual content, files, applications, and operating systems, may be transferred. The process returns to 1000 to obtain network traffic measurements. A transfer started or resumed at 1014 does not necessarily need to complete before going to 1000.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A computer-implemented method, comprising:
    receiving, at a processor, an indication to transfer, to a destination device, an application for accessing and/or manipulating a document;
    transferring, from the processor, a first set of executable data to the destination device; and
    initiating transfer, from the processor, of a second set of executable data to the destination device, wherein:
        the first set of executable data when executed on the destination device provides a first set of application operations for accessing and/or manipulating a document which includes an operation for viewing at least some portion of a document;
        the second set of executable data when executed on the destination device provides a second set of application operations for accessing and/or manipulating a document, including an operation associated with viewing and/or manipulating tags in a document where the tagging related operation was not included in the first set of application operations;
        said at least one application operation not included in the first set of application operations is locked at least while the second set of executable data is in the process of being transferred to the destination device; and
        the first set of executable data is able to be executed on the destination device and is able to provide the first set of application operations independent of whether the second set of executable data is located on the destination device.

2. A method as recited in claim 1 further including determining the first set of executable data based at least in part on user selection.

3. A method as recited in claim 1, further including:
    analyzing traffic exchanged via a network adapter to determine a level of network traffic; and
    determining, based at least in part on the determined level of network traffic, whether to (1) transfer the first set of executable data and initiate transfer of the second set of executable data or (2) transfer the application in a single transfer.

4. A method as recited in claim 1, wherein transfer of at least one of (1) the first set of executable data or (2) the second set of executable data is able to be interrupted.

5. A method as recited in claim 1, wherein at least part of transferring the second set of executable data overlaps with at least part of transferring the first set of executable data.

6. A method as recited in claim 1, wherein the first set of executable data and the second set of executable data do not include data in common.

7. A method as recited in claim 1, wherein the first set of executable data is a subset of the second set of executable data.

8. A method as recited in claim 1, wherein an earlier version of the application is on the destination device.

9. A method as recited in claim 1, wherein the second set of executable data is compiled.

10. A method as recited in claim 1, wherein the indication is received via a website and/or from an application on the destination device.

11. A method as recited in claim 1, wherein:
    the first set of executable data and the second set of executable data are associated with a common interface; and
    a feature of the common interface that is not supported by the first set of executable data is supported by the second set of executable data.

12. A method as recited in claim 1, wherein receiving the indication initiates transfer of the first set of executable data.

13. A method as recited in claim 1, wherein completing transfer of the first set of executable data initiates transfer of the second set of executable data.

14. A method as recited in claim 1, wherein the second set of executable data is usable at the destination device without disrupting usage of the first set of executable data after the second set of executable data is transferred to the destination device.

15. A system, comprising:
    a processor; and
    a memory coupled with the processor, wherein the memory provides the processor with instructions which when executed cause the processor to:
        receive an indication to transfer, to a destination device, an application for accessing and/or manipulating a document;
        transfer a first set of executable data to the destination device; and
        initiate transfer of a second set of executable data to the destination device, wherein:

the first set of executable data when executed on the destination device provides a first set of application operations for accessing and/or manipulating a document which includes an operation for viewing at least some portion of a document;

the second set of executable data when executed on the destination device provides a second set of application operations for accessing and/or manipulating a document, including an operation associated with viewing and/or manipulating tags in a document where the tagging related operation was not included in the first set of application operations;

said at least one application operation not included in the first set of application operations is locked at least while the second set of executable data is in the process of being transferred to the destination device; and the first set of executable data is able to be executed on the destination device and is able to provide the first set of application operations independent of whether the second set of executable data is located on the destination device.

16. A system as recited in claim 15, wherein the second set of executable data is compiled.

17. A computer program product, the computer program product being embodied in a computer readable storage medium and comprising computer instructions which when executed by a processor cause the processor to:

receiving an indication to transfer, to a destination device, an application for accessing and/or manipulating a document;

transferring a first set of executable data to the destination device; and initiating transfer of a second set of executable data to the destination device, wherein:

the first set of executable data when executed on the destination device provides a first set of application operations for accessing and/or manipulating a document which includes an operation for viewing at least some portion of a document;

the second set of executable data when executed on the destination device provides a second set of application operations for accessing and/or manipulating a document, including an operation associated with viewing and/or manipulating tags in a document where the tagging related operation was not included in the first set of application operations;

said at least one application operation not included in the first set of application operations is locked at least while the second set of executable data is in the process of being transferred to the destination device; and the first set of executable data is able to be executed on the destination device and is able to provide the first set of application operations independent of whether the second set of executable data is located on the destination device.

18. A computer program product as recited in claim 17, wherein the second set of executable data is compiled.

19. A system as recited in claim 15, wherein the memory provides the processor with further instructions for analyzing traffic exchanged via a network adapter to determine a level of network traffic; and determining, based at least in part on a level of network traffic, whether to (1) transfer the first set of executable data and initiate transfer of the second set of executable data or (2) transfer the application in a single transfer.

20. A computer program product as recited in claim 17 further comprising computer instructions for analyzing traffic exchanged via a network adapter to determine a level of network traffic; and determining, based at least in part on a level of network traffic, whether to (1) transfer the first set of executable data and initiate transfer of the second set of executable data or (2) transfer the application in a single transfer.

21. A method as recited in claim 1 further comprising generating the first set of executable data and the second set of executable data, including by assigning an application resource being assigned to either the first set of executable data or the second set of executable data based at least in part on an expected frequency of use for the application resource being assigned.

22. A system as recited in claim 15, wherein the memory provides the processor with further instructions for generating the first set of executable data and the second set of executable data, including by assigning an application resource being assigned to either the first set of executable data or the second set of executable data based at least in part on an expected frequency of use for the application resource being assigned.

23. A computer program product as recited in claim 17 further comprising computer instructions for generating the first set of executable data and the second set of executable data, including by assigning an application resource being assigned to either the first set of executable data or the second set of executable data based at least in part on an expected frequency of use for the application resource being assigned.

24. A method as recited in claim 21, wherein:

the first set of executable data includes an engine and a first set of one or more plug-ins and the second set of executable data includes a second set of one or more plug-ins that does not overlap with the first set of plug-ins; and the method further includes activating, after the second set of plug-ins is received, one or more controls in a graphical user interface of the application, wherein the one or more controls correspond to the second set of plug-ins.

25. A system as recited in claim 22, wherein:

the first set of executable data includes an engine and a first set of one or more plug-ins and the second set of executable data includes a second set of one or more plug-ins that does not overlap with the first set of plug-ins; and the memory provides the processor with further instructions for activating, after the second set of plug-ins is received, one or more controls in a graphical user interface of the application, wherein the one or more controls correspond to the second set of plug-ins.

26. A computer program product as recited in claim 23, wherein:

the first set of executable data includes an engine and a first set of one or more plug-ins and the second set of executable data includes a second set of one or more plug-ins that does not overlap with the first set of plug-ins; and the computer program product further includes computer instructions for activating, after the second set of plug-ins is received, one or more controls in a graphical user interface of the application, wherein the one or more controls correspond to the second set of plug-ins.

27. A method as recited in claim 1, wherein:

the first set of application operations further includes an operation for printing at least some portion of a document; and the second set of application operations further includes an operation for searching within a document where the searching operation was not included in the first set of application operations.

28. A system as recited in claim 15, wherein:

the first set of application operations further includes an operation for printing at least some portion of a document; and the second set of application operations further includes an operation for searching within a document where the searching operation was not included in the first set of application operations.

29. A computer program product as recited in claim 17, wherein:

the first set of application operations further includes an operation for printing at least some portion of a document; and the second set of application operations further includes an operation for searching within a document where the searching operation was not included in the first set of application operations.

* * * * *

UNITED STATES PATENT AND TRADEMARK OFFICE
CERTIFICATE OF CORRECTION

PATENT NO. : 7,730,164 B1 Page 1 of 1
APPLICATION NO. : 11/285948
DATED : June 1, 2010
INVENTOR(S) : Murugappan Palaniappan It is certified that error appears in the above-identified patent and that said Letters Patent is hereby corrected as shown below:

In the claims:
Claim 19
Column 15, line 61 delete "instructions for" and insert -- instructions for: --

Claim 20
Column 16, line 2 delete "instructions for" and insert -- instructions for: --

Signed and Sealed this

Third Day of August, 2010

David J. Kappos
*Director of the United States Patent and Trademark Office*